(12) United States Patent
Peterson

(10) Patent No.: US 12,135,053 B1
(45) Date of Patent: Nov. 5, 2024

(54) LUG BOLT HELPER

(71) Applicant: Scott Harold Peterson, Cadillac, MI (US)

(72) Inventor: Scott Harold Peterson, Cadillac, MI (US)

( * ) Notice: Subject to any disclaimer, the term of this patent is extended or adjusted under 35 U.S.C. 154(b) by 0 days.

(21) Appl. No.: 18/651,409

(22) Filed: Apr. 30, 2024

Related U.S. Application Data

(60) Provisional application No. 63/514,521, filed on Jul. 19, 2023.

(51) Int. Cl.
*F16B 37/14* (2006.01)
*F16B 35/00* (2006.01)
*B60B 3/16* (2006.01)

(52) U.S. Cl.
CPC .............. *F16B 37/14* (2013.01); *F16B 35/00* (2013.01); *B60B 3/16* (2013.01)

(58) Field of Classification Search
CPC ...... F16B 5/0275; F16B 5/0283; F16B 33/00; F16B 33/008; F16B 35/00; F16B 37/14; B60B 3/16; E05B 1/00; E05B 1/0007; E05B 1/0015; E05B 1/0053; E05B 1/0061; E05B 1/0069; A47B 2095/028
USPC ............ 411/337, 338, 366.1, 382, 383, 397; 16/414, 417, 433
See application file for complete search history.

(56) References Cited

U.S. PATENT DOCUMENTS

| | | | | |
|---|---|---|---|---|
| 2,327,891 A * | 8/1943 | Herman | ................... | H01H 3/10 74/543 |
| 3,361,174 A * | 1/1968 | Bedford, Jr. | ............ | F16B 37/14 411/301 |
| 3,785,670 A * | 1/1974 | Smith | ....................... | B62B 5/00 411/383 |
| 5,244,326 A * | 9/1993 | Henriksen | ............. | F16B 33/002 411/339 |
| 5,623,968 A * | 4/1997 | Thorp | ..................... | F15B 13/10 251/285 |
| 5,961,266 A * | 10/1999 | Tseng | ...................... | F16B 37/12 411/289 |
| 6,488,459 B2 * | 12/2002 | Carpenter | ............. | F16B 37/145 411/338 |
| 6,991,414 B1 * | 1/2006 | Mensah | ................ | F16B 37/145 411/338 |
| 8,434,982 B2 * | 5/2013 | Henriksen, Jr. | ........ | F16B 37/145 411/338 |
| 2006/0182513 A1 * | 8/2006 | Dortch | ................ | F16B 23/0061 411/338 |

(Continued)

*Primary Examiner* — Roberta S Delisle

(57) ABSTRACT

A mechanical fastening device is provided. The device comprises two principal components: a stud and a corresponding nut. The stud is engineered with a central longitudinal axis, a threaded section for robust engagement, and a handle section to enable manual manipulation without auxiliary tools. The nut component is outfitted with a manually operable knob, a rod section that incorporates a hollow interior to accommodate the stud, and an access opening positioned opposite the knob for straightforward insertion of the stud. Additionally, a strategically designed curved transition area between the rod section and the knob enhances the structural integrity of the nut and reduces the potential for snagging or injury during use. This invention is optimally suited for diverse applications that demand reliable and user-friendly fastening mechanisms.

17 Claims, 4 Drawing Sheets

(56) References Cited

U.S. PATENT DOCUMENTS

2013/0215381 A1\* 8/2013 Raghuprasad ....... G02C 5/2281
                                                                         411/338
2021/0108671 A1\* 4/2021 Theismann ........... F16B 41/005

\* cited by examiner

LUG BOLT HELPER

FIELD OF THE INVENTION

The present invention generally relates to the field of automotive maintenance and repair tools. More specifically, the present invention relates to an innovative automobile tool designed to enhance the efficiency, safety, and ease of performing mechanical adjustments and installations within automotive applications.

BACKGROUND OF THE INVENTION

An innovative automobile tool engineered to boost efficiency, safety, and ease of performing mechanical adjustments and installations in automotive applications is in high demand.

Lug nuts are commonly used to attach vehicle wheels to vehicles manufactured in America. In contrast, European-made vehicles and some others typically employ tapered wheel bolts instead of wheel studs and nuts. Vehicles equipped with wheel bolt hubs or axles may feature various threaded configurations to attach the wheel to the vehicle, securing each wheel to the hub or axle using lug bolts. Similar to vehicles using lug nuts, certain vehicles utilize lug bolts that are threaded and tightened to secure the wheel assembly to the hub.

The vehicle wheel may also be directly supported by the lug nuts, as these nuts often have a beveled inner face that matches a beveled portion on the wheel wall bores. Alternatively, the wheel may be hub-centric, supported by the hub, with lug bolts maintaining the wheel's attachment to the hub or axle.

However, the process of installing wheels with lug bolts can be cumbersome due to the absence of studs to support the wheel during installation, highlighting a need for a new tool to address this issue.

The present invention aims to resolve the challenges associated with installing wheels using lug bolts. The present invention seeks to enhance the functionality of conventional devices and improve the design and construction of these tools.

SUMMARY

In accordance with the present invention, a novel lug bolt helper device is provided. The device is designed for efficient and secure assembly in various applications. The device includes two primary components: a stud and a nut, each specifically engineered to enhance usability and reliability.

The stud component is constructed with a central longitudinal axis to ensure proper alignment, a threaded section for robust engagement with the nut, and a handle section. This handle section allows for manual manipulation of the stud, facilitating easy installation and adjustments without the need for additional tools.

The nut component features a manually operable knob, which simplifies the adjustment and tightening processes. Attached to this knob is a rod section, which includes a hollow interior designed to snugly accommodate the stud. An opening located opposite the knob provides straightforward access for the insertion of the stud, ensuring a seamless assembly process.

The device of the present invention also includes a curved transition area between the rod section and the knob. This design enhancement not only improves the structural integrity of the nut but also minimizes the risk of snagging or injury during handling, contributing to safer and more efficient operations.

DETAIL DESCRIPTIONS OF THE INVENTION

Figure 1:
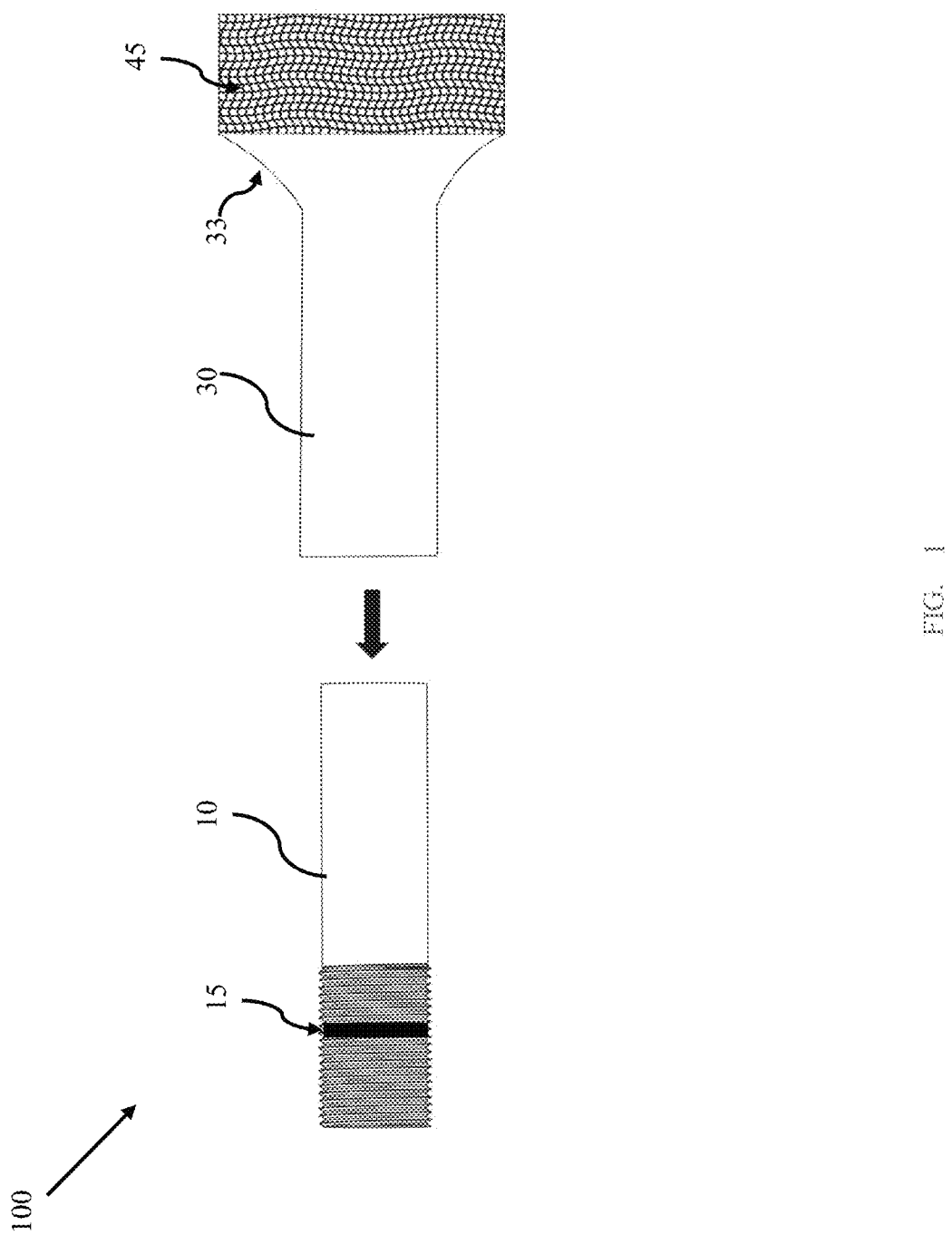
FIG. 1 is an illustration of an embodiment of the present invention.

All illustrations of the drawings are for the purpose of describing selected versions of the present invention and are not intended to limit the scope of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings.

Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present invention holds the wheel in place on vehicles with wheel bolts, allowing easier installation. Often, these vehicles are European brands such as Volkswagen, BMW, and Audi.

As shown in FIGS. 1-4, the present invention provides a tool (device) 100 comprising a stud 10 and a nut 30.

In one embodiment, the tool (the device of the present invention, Lug Bolt Helper) 100 can be made of steel or any other suitable material.

The Stud 10

The stud 10 can include a longitudinally elongated rod that can be threaded.

Figure 2:
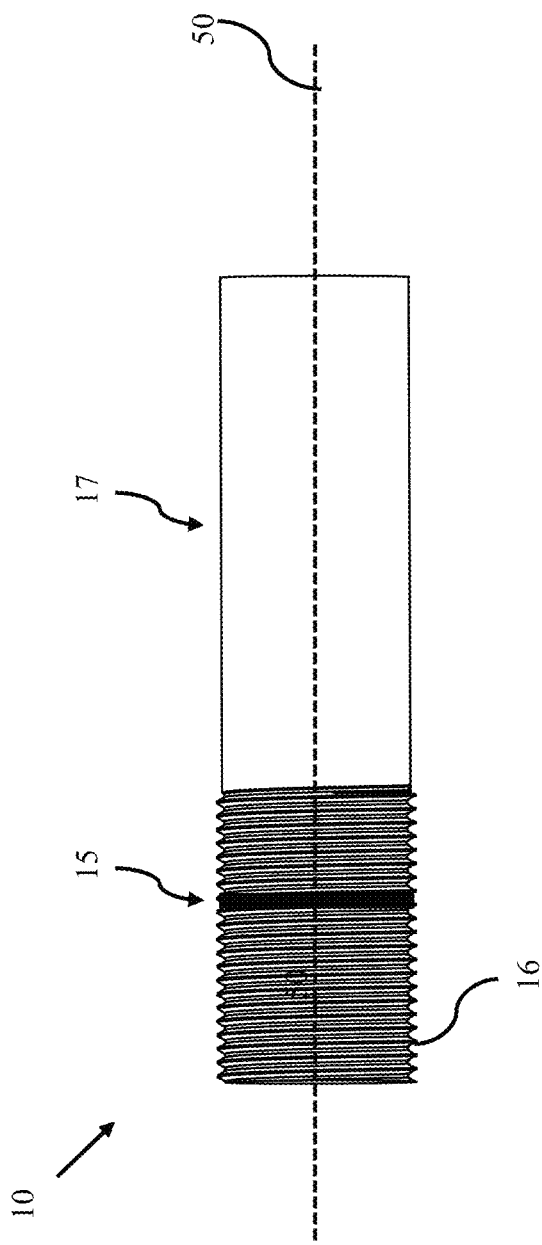
FIG. 2 is an illustration of an embodiment of the stud of the present invention.

In one embodiment, the stud 10 may include external threads, as shown in FIG. 2. In certain embodiments, as shown in FIG. 1 and FIG. 2, the stud 10 may further include a groove section 15 configured to accommodate an e-clip or a bulge. The e-clip or bulge serves as a stop mechanism to prevent excessive threading of the stud 10 into a vehicle wheel hub. Such configuration ensures that sufficient threads remain exposed for secure attachment of a nut 30, thereby preventing the nut 30 from being inadequately secured due to insufficient threading.

In another embodiment, the stud 10 can be double sided. In some embodiments, the stud 10 may include a handle section 17 for installation and removal, the handle section 17 can be knurled.

The Nut 30

Figure 3:
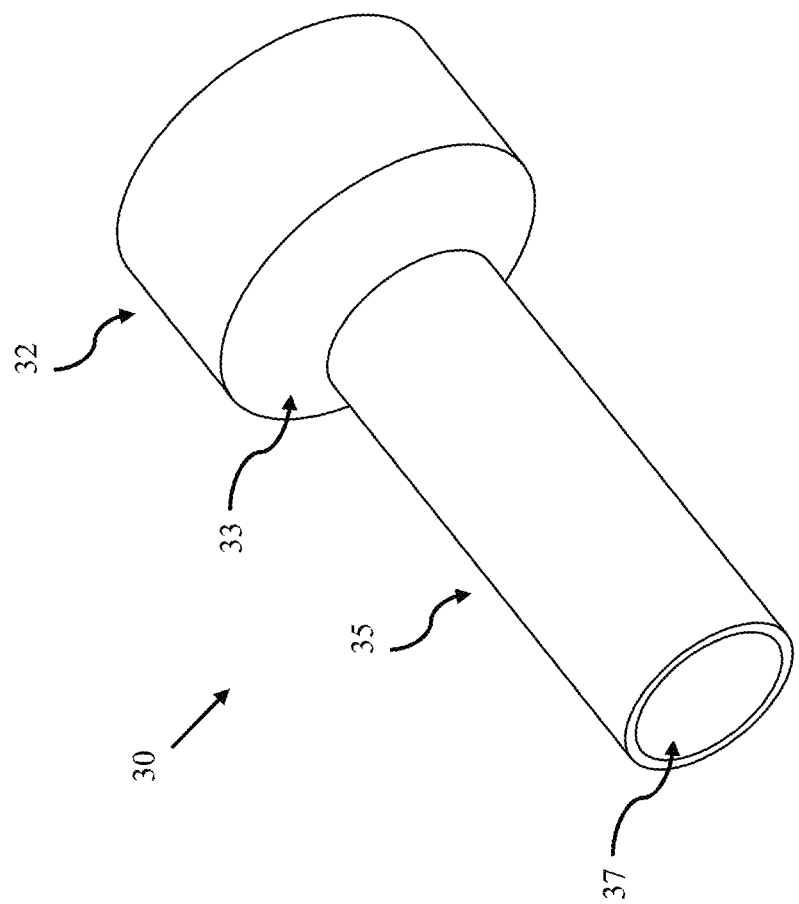
FIG. 3 is an illustration of the nut of the present invention.

As shown in FIG. 3, the nut 30 may be characterized by a combination of a knob 32, a smoothly curved transition area 33 between the knob 32 and the rod section 35, and a rod section 35 featuring a hollow section 37 that can be internally threaded.

The nut 30 may include a rod section 35 and a knob 32 of a suitable shape. The knob 32 can be a round knob or any other suitable knob.

Figure 4:
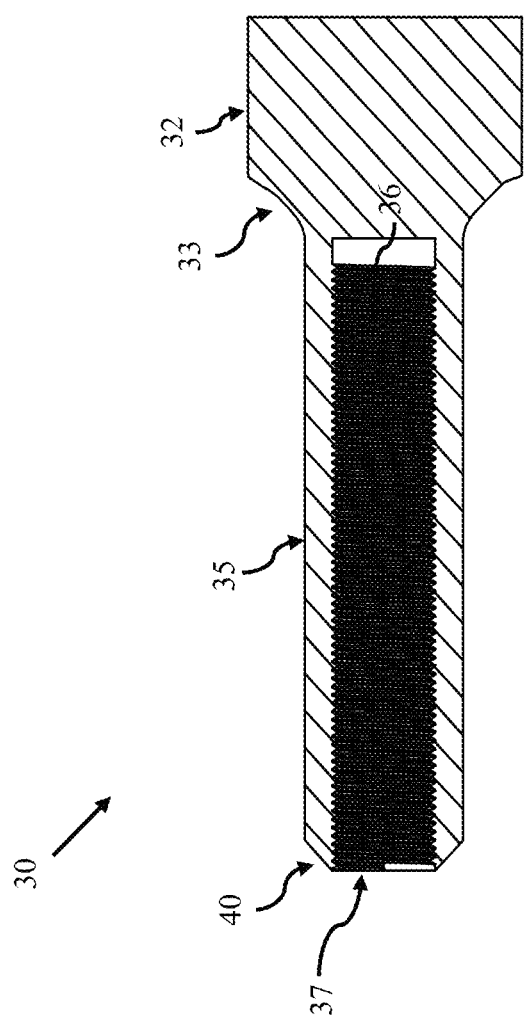
FIG. 4 is a cross-sectional view of the nut with a beveled nose at the distal end of the rod section.

In one embodiment, as shown in FIG. 4, the nut 30 has a beveled nose 40 at the end of the rod section 35 to match the wheel bevel or tapper, wherein the beveled nose 40 can be angled at 45 degrees.

In one embodiment, the upper portion of the nut 30 may feature a knob 32 that is knurled (as shown in FIG. 1, knurled area 45), characterized by a circumferential, textured surface designed to enhance grip. This allows for efficient manual adjustments, making the nut particularly suitable for applications where quick and frequent adjustments are necessary without the use of any other tools.

In one embodiment, the knob 32 can be a cylindrical head.

Extending from the knob 32 is a rod section 35, designed with a hollow section 37 that can be internally threaded. This hollow section 37, threaded configuration allows for the insertion of a complementary threaded component, such as the stud 10 of the present invention or a bolt or a screw, enhancing the device's 100 versatility and application scope.

The precise engineering of the internal threading ensures a secure and stable engagement with other components, thereby bolstering the device's 100 structural integrity and reliability.

Connecting the knob 32 to the rod section 35 is a smoothly curved transition area 33. This design element not only contributes to the aesthetic appeal of the nut 30 but also eliminates sharp edges or abrupt changes in profile, which can be prone to mechanical stress concentrations. The smooth curvature of the transition area 33 facilitates a seamless flow of force and stress across the nut 30, enhancing its mechanical resilience and durability.

In preferred embodiment, the nut 30 features a beveled nose 40 at the distal end of the rod section 35, incorporating a 45-degree angle. This design is meticulously crafted to align with the bevel or taper of an automobile wheel or a comparable component, ensuring a flush and centered fit upon engagement. This specific configuration is essential for applications that demand exact alignment and robust engagement, significantly reducing the likelihood of mechanical failure and enhancing the operational longevity of the assembly.

In one embodiment, the disclosed invention provides a device 100 comprising: a stud 10 that includes:
  a central longitudinal axis 50, serving as the primary alignment feature for precise positioning and alignment;
  a threaded section 16 engineered to engage with (detachably engaged with) matching threads 36 on a nut 30, ensuring a secure and stable connection; and
  a handle section 17 situated at one end of the stud 10, specifically designed to offer a comfortable gripping surface that facilitates manual rotation and handling, eliminating the need for additional tools.
a nut 30 that features:
  a knob 32, which acts as a manual grip to facilitate the turning of the nut 30, thereby enhancing the ease of installation and adjustments;
  a rod section 35 connected to the knob 32, distinguished by: a hollow section 37 within the rod section 35, extending longitudinally from the end opposite the knob 32. This hollow section 37 is tailored to accommodate the stud 10 or other compatible components.

In addition, the nut 30 includes an opening located at the end opposite the knob 32, which allows access to the hollow section 37 for the insertion of the stud 10 or other elements.

In addition, the nut 30 includes a curved transition area 33 between the rod section 35 and the knob 32, crafted to enhance structural integrity and provide a smooth contour that minimizes the risk of snagging or causing injury during handling.

In one embodiment of the present invention, the rod section 35 is configured with a total length of 3.875 inches. Additionally, the knob 32 is designed with a diameter of 1.44 inches and a depth of 0.625 inches. Furthermore, the interior threading of the rod section 35 is engineered to have a diameter of 12 mm and a pitch of 1.5 mm.

It should be noted that dimensions specified herein are intended for illustrative purposes only and are not intended to limit the scope of the invention. Thus, variations in the thread sizes and pitches of the rod section 35 and the stud 10, including the area opposite the handle section 17 of the stud 10, are contemplated.

Method of Using the Device 100

The present invention also discloses a method for facilitating the installation and alignment of wheel assemblies on a vehicle, comprising the following steps:
- Step 1: A special double-sided stud 10 is installed into the vehicle's hub.
- Step 2: The wheel assembly is then hung on the aforementioned stud 10.
- Step 3: A specialized nut 30, equipped with a knob 32 or handle, is screwed onto the stud 10 to secure the wheel assembly in place.

The innovative design of the present invention significantly simplifies the installation process of the remaining wheel bolts. Moreover, it enhances the accuracy of the alignment of these bolts, effectively preventing damage to the threads within the hub due to misalignment.

Upon successful installation of the other bolts, the tool (device 100 of the present invention), inclusive of the stud 10, is removed. Subsequently, the final bolt is installed, completing the assembly process. This method ensures a streamlined and damage-free installation, contributing to the overall integrity and functionality of the vehicle's wheel system.

Although the invention has been explained in relation to its preferred embodiment, it is to be understood that many other possible modifications and variations can be made without departing from the spirit and scope of the invention.

What is claimed is:

1. Device comprising:
   a stud comprising:
      a central longitudinal axis,
      a threaded section, wherein the threaded section includes a groove section, and
      a handle section; and
   a nut detachably engaged with the stud, the nut comprising:
      a knob, wherein the knob includes a cylindrical head,
      a rod section attached to the knob, wherein the rod section includes a hollow section with an opening positioned opposite the knob and a curved transition area placed between the rod section and the knob.

2. The claim as claimed in claim 1, wherein the knob includes a knurled area.

3. The claim as claimed in claim 2, wherein the stud and the nut are made of steel metal.

4. The claim as claimed in claim 1, wherein the groove section includes an e-clip.

5. The claim as claimed in claim 1, wherein the groove section includes a bulge.

6. The claim as claimed in claim 1, wherein hollow section of the nut includes threads.

7. Device comprising:
   a stud comprising:
      a central longitudinal axis,
      a threaded section, wherein the threaded section includes a groove section, and
      a handle section, wherein the handle section is knurled; and
   a nut detachably engaged with the stud, the nut comprising:
      a knob, wherein the knob includes a knurled area,
      a rod section attached to the knob, wherein the rod section includes a hollow section with an opening positioned opposite the knob and a curved transition area placed between the rod section and the knob.

8. The claim as claimed in claim 7, wherein the stud and the nut are made of steel metal.

9. The claim as claimed in claim 7, wherein the groove section includes an e-clip.

10. The claim as claimed in claim 7, wherein the groove section includes a bulge.

11. The claim as claimed in claim 7, wherein hollow section of the nut includes threads.

12. Device comprising:
    a stud comprising:
       a central longitudinal axis,
       a threaded section, wherein the threaded section includes a groove section, and
       a handle section, wherein the handle section is knurled; and
    a nut detachably engaged with the stud, the nut comprising:
       a knob,
       a rod section attached to the knob, wherein the rod section includes a hollow section with an opening positioned opposite the knob, a beveled nose at the distal end of the rod section, and a curved transition area placed between the rod section and the knob.

13. The claim as claimed in claim 12, wherein the knob includes a knurled area.

14. The claim as claimed in claim 12, wherein the stud and the nut are made of steel metal.

15. The claim as claimed in claim 12, wherein the groove section includes an e-clip.

16. The claim as claimed in claim 12, wherein the groove section includes a bulge.

17. The claim as claimed in claim 12, wherein hollow section of the nut includes threads.

* * * * *